(12) United States Patent
Tai et al.

(10) Patent No.: US 6,342,968 B1
(45) Date of Patent: Jan. 29, 2002

(54) FREQUENCY TUNING OF OPTICAL DEVICES

(75) Inventors: Kuochou Tai, Fremont; Kok-Wai Chang, Los Altos, both of CA (US)

(73) Assignee: JDS Uniphase Corporation, San Jose, CA (US)

(*) Notice: Subject to any disclaimer, the term of this patent is extended or adjusted under 35 U.S.C. 154(b) by 0 days.

(21) Appl. No.: 09/517,641

(22) Filed: Mar. 3, 2000

Related U.S. Application Data

(63) Continuation-in-part of application No. 09/476,611, filed on Dec. 31, 1999, and application No. 09/476,609, filed on Dec. 31, 1999, and application No. 09/476,034, filed on Dec. 31, 1999.

(51) Int. Cl.[7] .................................................. G02B 5/30
(52) U.S. Cl. ........................ 359/494; 359/497; 359/501
(58) Field of Search ................................ 359/494, 500, 359/507, 497

(56) References Cited

U.S. PATENT DOCUMENTS

| | | | |
|---|---|---|---|
| 3,934,210 A | * 1/1976 | Yarborough et al. | 359/498 |
| 4,464,022 A | 8/1984 | Emkey | |
| 4,772,104 A | * 9/1988 | Buhrer | 359/497 |
| 5,164,946 A | * 11/1992 | Negus et al. | 359/500 |
| 5,204,771 A | 4/1993 | Koga | |
| 5,471,340 A | 11/1995 | Cheng et al. | |
| 5,694,233 A | 12/1997 | Wu et al. | |
| 5,867,291 A | 2/1999 | Wu et al. | |
| 5,930,039 A | 7/1999 | Li et al. | |

OTHER PUBLICATIONS

E. O. Ammann, "Synthesis of Electro–Optic Shutters having a Prescribed Transmission vs Voltage Characteristic", Journal of the Optical Society of America, Aug. 1966, pp. 1081–1088, vol. 56, No. 8, USA.

S.E. Harris, E. O. Ammann & I.C. Chang, "Optical Network Synthesis Using Birefringent Crystals", Journal of the Optical Society of America, Oct. 1964, pp. 1267–1279, vol. 54, No. 10, USA.

Benjamin B. Dingel & Masayuki Izutsu, "Multifunction Optical Filter with a Michelson–Gires–Tournois Interferometer for Wavelength–Division–Multiplexed Network System Applications", Optics Letters; Jul. 15, 1998; pp. 1099–1101, vol. 23, No. 14, Optical Society of America, USA.

Benjamin B. Dingel & Tadashi Aruga, "Properties of a Novel Noncascaded Type, Easy–to–Design, Ripple–Free Optical Bandpass Filter", Journal of Lightwave Technology, Aug. 1999, pp. 1461–1469, vol. 17, No. 8, USA.

Amnon Yariv and Pochi Yeh, "Jones Calculus and its Application to Birefringent Optical Systems." Optical Waves in Crystals, Propogation and Control of Laser Radiation, 1984, pp. 121–155, John Wiley & Sons, Inc., USA.

* cited by examiner

*Primary Examiner*—Darren Schuberg
(74) *Attorney, Agent, or Firm*—Lacasse & Associates; Randy W. Lacasse; Kevin E. Greene

(57) ABSTRACT

Methods and apparatuses for tuning optical devices are described. Optical devices can be tuned by inserting tuning plates into the optical path(s) of the devices. Tuning plates can be, for example, quartz plates. By selecting the appropriate thickness and optical axis orientation, the tuning plate can be used to tune the optical devices to a precision that is unavailable through manufacturing specifications and tolerances of the components of the optical device alone. Because quartz has a relatively small birefringence, tuning plates made with quartz can be thicker, and therefore manufactured more precisely than the components of the optical devices.

13 Claims, 11 Drawing Sheets

FREQUENCY TUNING OF OPTICAL DEVICES

The present U.S. patent application is a continuation-in-part of U.S. patent application Ser. No. 09/476,611, entitled "MULTI-PASS FOLDED INTERLEAVER/DEINTERLEAVERS," U.S. patent application Ser. No. 09/476,034, entitled "DOUBLE-PASS FOLDED INTERLEAVER/DEINTELEAVERS," and U.S. patent application Ser. No. 09/476,609, entitled "SINGLE-PASS FOLDED INTERLEAVER/DEINTERLEAVERS," all of which were filed Dec. 31, 1999.

FIELD OF THE INVENTION

The present invention relates to the tuning of optical devices, and more particularly, to the tuning of optical devices including birefringent elements, such as interleavers and deinterleavers.

BACKGROUND OF THE INVENTION

Optical devices and components and associated networks generally have greater bandwidth than wired components and networks. One of the technologies that allows optical components and networks (WDM), which provides increased capacity on fiber optic cables. Dense wavelength division multiplexing (DWDM) is a further improvement of WDW.

WDW and DWDW technologies combine multiple optical signals into a single fiber by transporting different signal on different optical wavelenghts or channels. Interleaving and deinterleaving can be accomplished in many ways. As channel spacing becomes denser, optical components generally must become smaller and more precisely manufactured. For some applications, the precision required for acceptable performance exceeds available manufacturing tolerances. For these applications what is needed is a technique for tuning optical devices to greater precision than through manufacturing specifications and tolerances alone.

SUMMARY OF THE INVENTION

Accordingly, the present invention relates to a method of tuning an optical component, of the type including at least one birefringent subcomponent, comprising the steps of:
determining a frequency response of the optical component; and
modifying the frequency response of the optical component with a tuning plate having a thickness and an optical axis orientation;
wherein the tuning plate has a small birefringence as compared to at least one of the birefringent subcomponents.

Another aspect of the present invention relates to an apparatus for tuning an optical component, of the type including at least one birefringent subcomponent, comprising:
means for determining a frequency response of the optical component; and
means for modifying the frequency response of the optical component with a tuning plate having a thickness and an optical axis orientation;
wherein the tuning plate has a small birefringence as compared to at least one of the birefringent subcomponents.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Methods and apparatuses for tuning optical devices are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Optical devices can be tuned by inserting tuning plates into the optical path(s) of the devices. Tuning plates can be, for example, quartz plates. By selecting the appropriate thickness and optical axis orientation, the tuning plate can be used to tune the optical devices to the precision that is unavailable through manufacturing specifications and tolerances of the components of the optical device alone. Because quartz has a relatively small birefringence, tuning plates made with quartz can be thicker, and therefore manufactured more precisely than the components of the optical devices.

Figure 1:
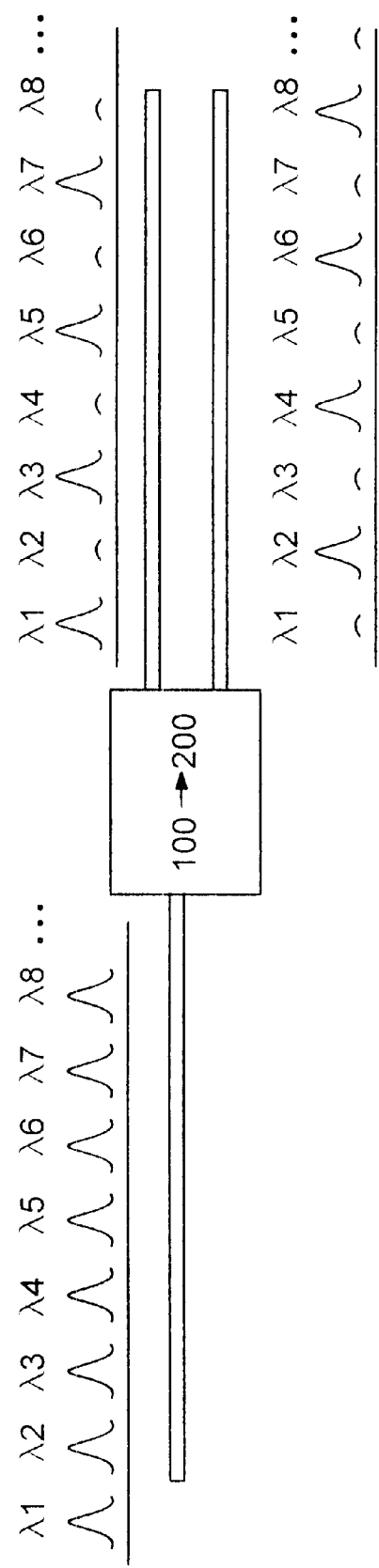
FIG. 1 is a conceptual illustration of a conversion from an optical channel scheme having 100 GHz acing to an optical channel scheme having 200 GHz.

FIG. 1 is a conceptual illustration of a conversion from an optical channel scheme having 100 GHz spacing to an optical channel scheme having 200 GHz. The conversion of FIG. 1 is useful, for example, to allow devices designed to operate with an optical channel scheme having 200 GHz channel spacing to interact with other devices or a network designed to operate with an optical channel scheme having 100 GHz channel spacing. Conversion between 100 GHz channel spacing and 200 GHz channel spacing allows, for example, network bandwidth to be increased without upgrading all of the devices that interact with the network.

In one embodiment, the converter of FIG. 1 is a deinterleaver that separates an optical signal having even and odd channels (e.g., ITU channels) into a first optical signal including the even channels and a second optical signal including the odd channels. After the signals are deinterleaved, the odd channels have a 200 GHz spacing and the even channels have a 200 GHz spacing. Recombining the even and the odd channels into a single signal can be accomplished with an interleaver. In other words, the even and odd channels having 200 GHz spacing can be combined (interleaved) into an optical signal having 100 GHz signal spacing. Similar interleaving can be provided to convert between 100 GHz spaced channels and 50 GHz spaced channels, as well as between other sets of channel spacing schemes.

Figure 2:
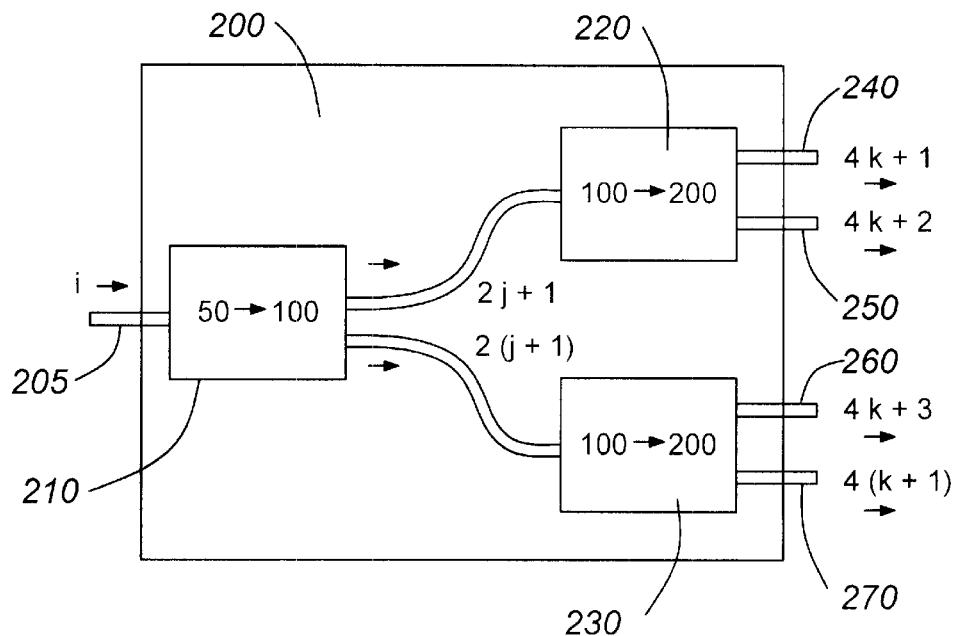
FIG. 2 is is a block diagram of one embodiment of an optical deinterleaver for conversion form an optical channel scheme having 50 GHz spacing to an optical channel scheme having 200 GHz spacing.

FIG. 2 is a block diagram of one embodiment of an optical deinterleaver for conversion from an optical channel scheme having 50 GHz spacing to an optical channel scheme having 200 GHz spacing. In general, deinterleaver 200 includes deinterleaver 210 to convert from one set of 50 GHz spaced channels to two sets of 100 GHz spaced channels. Deinterleaver 200 also includes two deinterleavers (220 and 230) each of which convert one of the sets of 100 GHz spaced channels to two sets of 200 GHz spaced channels. Deinterleaver 200 allows devices designed for 200 GHz spaced channels to interact with devices or networks designed for 50 GHz spaced channels.

Optical fiber 205 carries a set of optical channels, i, having 50 GHz spacing. Deinterleaver 210 separates the set of optical channels into sets of even, 2(j+1), and odd, 2j+1, channels. The even channels are input to deinterleaver 230 and the odd channels are input deinterleaver 220. The even and the odd channels have 100 GHz spacing.

Deinterleavers 220 and 230 operate to further separate the set of optical channels. Conceptually, deinterleaver 220 and 230 operate on the respective 100 GHz spaced channels to separate the input channels into "even" and "odd" channels. The sets of channels output by deinterleavers 220 and 230 have 200 GHz spacing.

Deinterleaver 220 separates the odd channels into two sets of channels, odd—odd channels, 4k+1, output by optical fiber 240 and odd-even, 4k+2, channels output by optical fiber 250. Deinterleaver 230 separates the even channels into two sets of channels, the even-odd, 4k+3, channels output by optical fiber 260 and the even-even, 4(k+1), channels output by optical fiber 270.

The four sets of channels output by deinterleaver 200 are 200 GHz spaced channels. Thus, deinterleaver 200 can be used to interface one or more devices designed to operate on 200 GHz spaced channels with one or more devices or networks designed to operate on 50 GHz spaced channels. Other channel spacings can also be supported.

Figure 3:
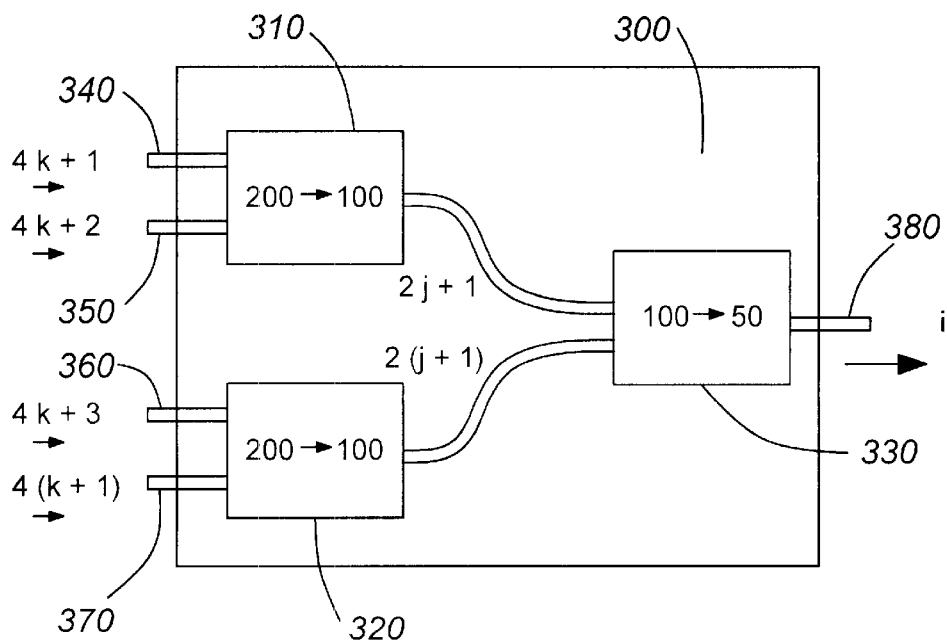
FIG. 3 is a block diagram of one embodiment of an optical interleaver for conversion from an optical channel scheme having 200 GHz spacing to an optical channel scheme having 50 GHz spacing.

FIG. 3 is a block diagram of one embodiment of an optical interleaver for conversion from an optical channel scheme having 200 GHz spacing to an optical channel scheme having 50 GHz spacing. In general, interleaver 300 includes interleaver 310 to convert from two sets of 200 GHz spaced channels to one set of 100 GHz spaced channels. Similarly, interleaver 320 converts from two sets of 200 GHz spaced channels one set of 100 GHz channels. Interleaver 330 converts the two sets of 100 GHz spaced channels to one set of 50 GHz spaced channels. Interleaver 300 allows devices designed for 200 GHz spaced channels to interact with devices or networks designed for 50 GHz spaced channels.

The odd—odd, 4k+1, channels having 200 GHz spacing are input to interleaver 310 via optical fiber 340. The odd-even, 4k+2, channels having 200 GHz spacing are input to interleaver 310 via optical fiber 350. Interleaver 310 interleaves the odd-odd channels and the odd-even channels to generate a set of odd, 2j+1, channels having 100 GHz spacing.

The even-odd, 4k+3, channels having 200 GHz spacing are input to interleaver 320 via optical fiber 360. The even-even, 4(k+1), channels having 200 GHz spacing are input to interleaver 320 via optical fiber 370. Interleaver 320 interleaves the even-odd channels and the even-even channels to generate a set of even, 2(j+1), channels having 100 GHz spacing.

Interleaver 330 interleaves the even and odd channels to generate a set of channels, i, having 50 GHz spacing. Thus, interleaver 300 allows devices designed to operate on optical channels having 200 GHz spacing to interact with devices designed to operate on optical channels having 50 GHz spacing. Other channels spacings can also be supported.

Figure 4:
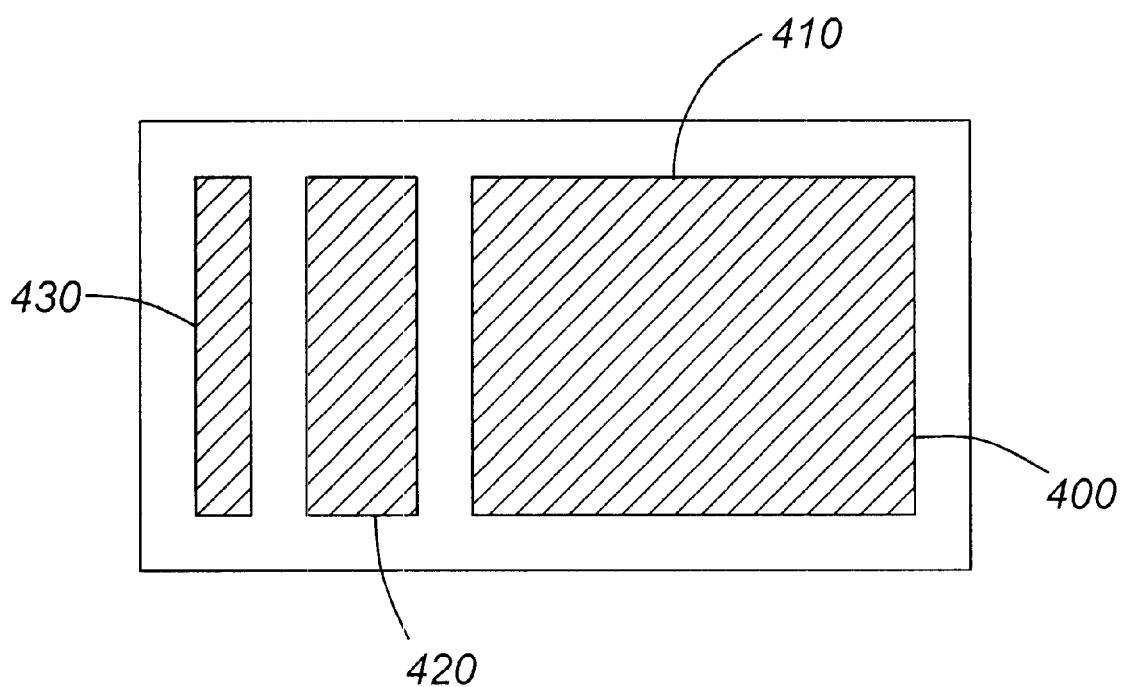
FIG. 4 illustrates one embodiment of a birefringent element cell tuned with a tuning plate.

FIG. 4 illustrates one embodiment of a birefringent element tuned with a tuning plate. Other types of optical elements can also be tuned with a tuning plate. In one embodiment, birefringent element 400 includes $TiO_2$ crystal 420 and $YVO_4$ crystal 410. Other crystal materials can also be used to provide a birefringent element. In one embodiment, both $TiO_2$ crystal 420 and $YVO_4$ crystal 410 are oriented normal to, or nearly normal to, an optical path for signals that pass through the cell.

Birefringent element 400 is tuned by inserting tuning plate 430 within birefringent element 400 in the optical path. The thickness of tuning plate 430 is selected to provide the desired frequency offset. In one embodiment, tuning plate 430 is quartz ($SiO_2$); however, other materials can also be used. Because the crystals of birefringent element 400 are normal to the optical path, walk-off effects that are caused by angle tuning are reduced or eliminated.

Figure 5:
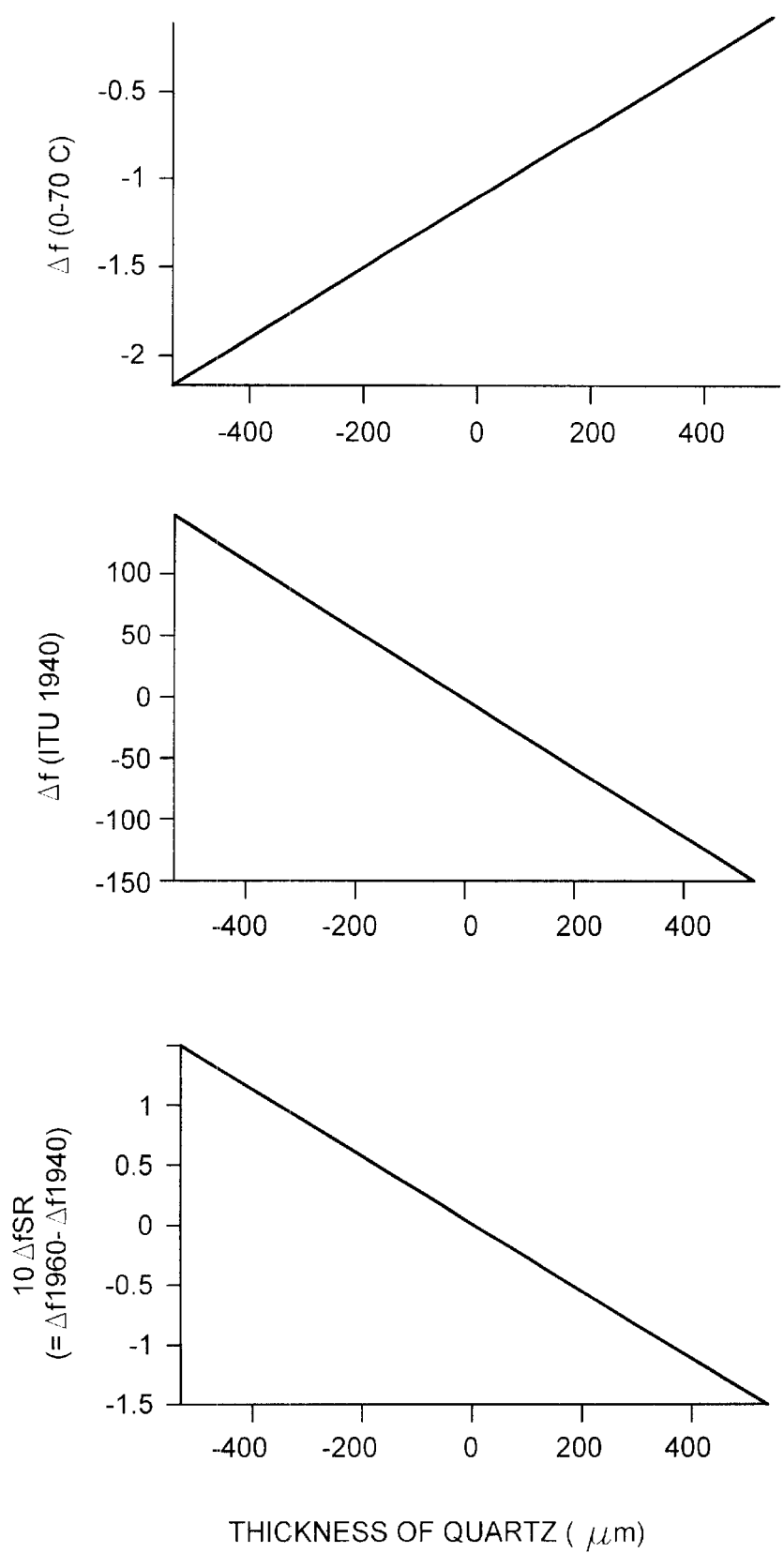
FIG. 5 illustrates frequency sensitivity of cell tuning with a quartz plate.

FIG. 5 illustrates frequency sensitivity of cell tuning with a quartz plate. The top graph shows change in frequency (0–70° C.) as a function of tuning plate thickness (in $\mu$m). The middle graph shows change in frequency (at ITU channel 1940) as a function of tuning plate thickness (in $\mu$m). The third graph shows ten times the change in frequency as a function of tuning plate thickness (in $\mu$m).

Positive tuning plate thickness corresponds to configurations when the optical axis of the tuning plate is parallel to the optical axis of $YVO_4$ crystal 410. Negative tuning plate thickness corresponds to configurations when the optical axis of the tuning plate is perpendicular to the optical axis of $YVO_4$ crystal 410.

Figure 6:
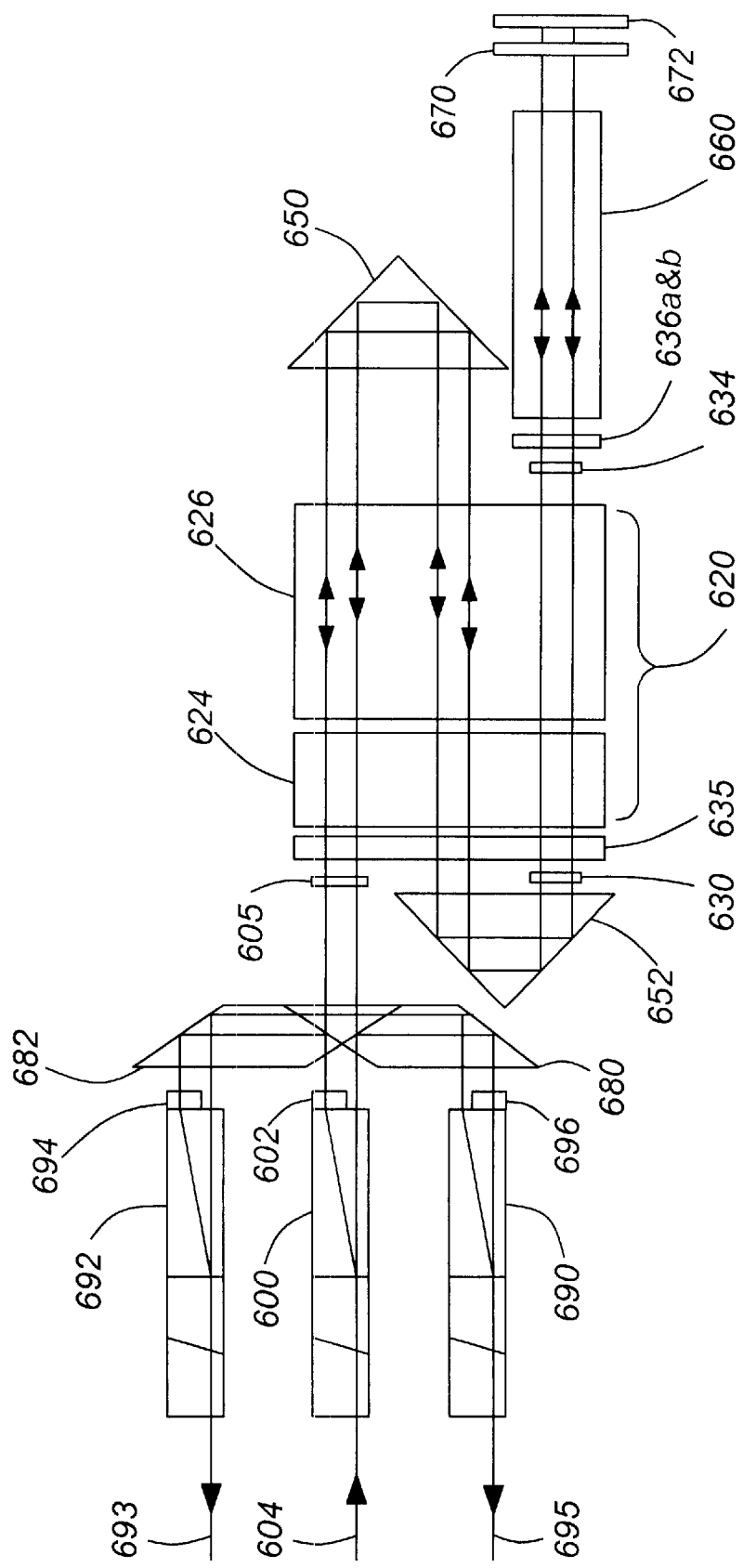
FIG. 6 illustrates top view of one embodiment of a double-pass folded interleaver/deinterleaver.

FIG. 6 illustrates a top view of one embodiment of a double-pass folded interleaver/deinterleaver. Other embodiments of double-pass folded interleaver/deinterleavers that can be tuned with tuning plates can be found in U.S. patent application Ser. No. 09/476,034, entitled "DOUBLE-PASS FOLDED INTERLEAVER/DEINTELEAVERS."

The arrows of FIG. 6 correspond to the double-pass folded interleaver/deinterleaver operating as a deinterleaver. In other words an optical signal carrying information on multiple frequencies, for example, a wavelength division multiplexed (WDM) signal is receives and separated into two optical signals, each of which include a predetermined subset of frequencies (e.g., even channels and odd channels) from the input optical signal. Alternate embodiments of a double-pass folded interleaver/deinterleavers can be found in the parent patent applications referenced above.

As a brief overview, the optical signal is horizontally polarized to the first pass through the birefringent element. The even and odd channels are separated using the half wave plates and the birefringent element during the first pass. The separated signals are then reflected and rotated for a second pass through the birefringent element.

An optical signal is received through port 600. In one embodiment, port 600 is a collimator assembly having a GRIN lens to collimate the light and a walk-off crystal to separate the horizontally polarized and the vertically polarized components of the optical signal. Other types of lenses can also be used, or pre-collimated light can be received. Port 600 receives an optical signal via an optical fiber and collimates the optical signal with the GRIN lens.

In one embodiment, port 600 also includes half wave plate 602 to rotate either the vertically polarized component or the horizontally polarized component of the optical signal. In one embodiment, half wave plate 602 has an azimuth angle of 45° with respect to an optical signal received by port 600 from optical fiber 604. In one embodiment, the walk-off crystal of port 600 offsets the vertically polarized component of the optical signal and half wave plate 602 causes the vertically polarized component to be horizontally polarized such that both components are horizontally polarized when the components pass through polarizer 605.

The collimated optical signal is directed to polarizer 605 through an opening between walk-off crystal 680 and walk-off crystal 682. In one embodiment, polarizer 405 provides polarization in the range of 0° to 15° (e.g., 2.6°) for optical signals passing from port 600 to birefringent element 620, however, other polarizations can be provided based on, for example, the azimuth angles of one or more half wave plates.

After passing through polarizer 605, the optical signal is directed to birefringent element 620. In one embodiment, birefringent element 620 is composed of crystals 624 and 626 that are selected to provide improved thermal stability over a range of operating temperatures as compared to a single birefringent crystal. In one embodiment, crystal 624 is a $TiO_2$ crystal having a thickness of 2 mm, and crystal 626 is a $YVO_4$ crystal having a thickness of 9.5 mm; however, other sizes can also be used. Other birefringent elements can also be used, for example, a single crystal can be used if temperature stability is not important, or other two-crystal birefringent elements can be used.

After passing through birefringent element 620, the optical signal is reflected by reflective element 650. In one embodiment, reflective element 650 is a 90° reflecting crystal; however, other reflective elements can be used based on, for example, the physical layout of the interleaver/deinterleaver. In one embodiment, the face(s) through which the optical signal is received and/or reflected has a low-order compensator to compensate for phase shift in the respective crystals. In alternate embodiments, the low-order compensator can be omitted.

The optical signal reflected by reflective element 650 is directed through birefringent element 620 to reflective element 652. After being reflected by reflective element 652, the optical signal passes through half wave plate 630. In one embodiment, half wave plate 630 is oriented with the an azimuth angle in the range of 0° to −15°, e.g. −6.5°, for optical signals passing from the reflective element 652 to the birefringent element 620. Other azimuth angles for half wave plate 630 can be used for different filtering characteristics or physical configurations. Half wave plate 630 introduces a relative phase difference of 180° between the ordinary and extraordinary components of the optical signal.

After passing through birefringent element 620 as reflected by reflective element 652, the optical signal passes through half wave plate 634. In one embodiment, half wave plate 634 has an azimuth angle is in the range of 15° to 30° (e.g., 22.5°) for optical signals passing from to birefringent element 620 to walk-off crystal 660. Other azimuth angles for half wave plate 634 can be used for different filtering characteristics or physical configurations.

Tuning plate 635 is used to tune the interleaver/deinterleaver. The thickness of tuning plate 635 is chosen to center the passbands of the interleaver/deinterleaver around desired frequencies. In one embodiment tuning plate 635 is made of quartz ($SiO_2$); however, other materials can be used. Tuning plate 635 can be positioned in other locations within the interleaver/deinterleaver.

When the optical signal is traveling from birefringent element 620, the optical signal passes between half wave plates 636a and 636b. In one embodiment, the azimuth angle of half wave plates 436a and 436b are in the range of 40° to 50° (e.g., 45°) for optical signals passing from walk-off crystal 660 to birefringent element 620; however, the azimuth angle can be different with appropriate changes to the azimuth angles of one or more other half wave plates and/or polarizer 605.

The optical signals pass through half wave plate 670 and are reflected by quarter wave mirror 672. In one embodiment, the azimuth angle of half wave plate 670 is in the range of 40° to 50° (e.g., 45°) for optical signals passing from walk-off crystal 660 to quarter wave mirror 672; however, the azimuth angle can be different with appropriate changes to the azimuth angles of one or more other half wave plates and/or polarizer 605. Quarter wave mirror 672 reflects the optical signals back through walk off crystal 660. Quarter wave mirror 672 also introduces a relative phase shift of 90° between the ordinary and extraordinary components of the optical signal.

Half-wave plates 636a and 636b rotate the optical signal components to orthogonal polarizations. After passing through half-wave plates 636a and 636b, the optical signals pass through birefringent element 620, through half wave plate 630, and are reflected by reflective elements 652 through birefringent element 620 to reflective element 650. Reflective element 650 reflects the signal through birefringent element 620 and polarizer 605 to walk-off crystals 680 and 682. Walk-off crystals 680 and 682 direct the optical signals to ports 690 and 692, respectively.

Port 690 includes half wave plate 696 and port 692 includes half wave plate 694. In one embodiment, both half wave plate 694 and half wave plate 696 have azimuth angles of 45° with respect to optical signals received from walk-off crystal 682 and walk-off crystal 680, respectively. Half wave plate 694 and 696 rotate the optical components received such that ports 692 and 690, respectively, each receive a vertically polarized component and a horizontally polarized component, which are combined and directed to optical fibers 693 and 695, respectively.

For the optical device of FIG. 6 to operate as an interleaver, two sets of optical signals are input to ports 690 and 692. The two sets of optical signals are combined in a manner that is the reverse of the deinterleaver function described above. The combined (interleaved) optical signal is output through port 600. Thus, the apparatus illustrated in FIG. 6 can operate as an interleaver or as a deinterleaver.

Figure 7:
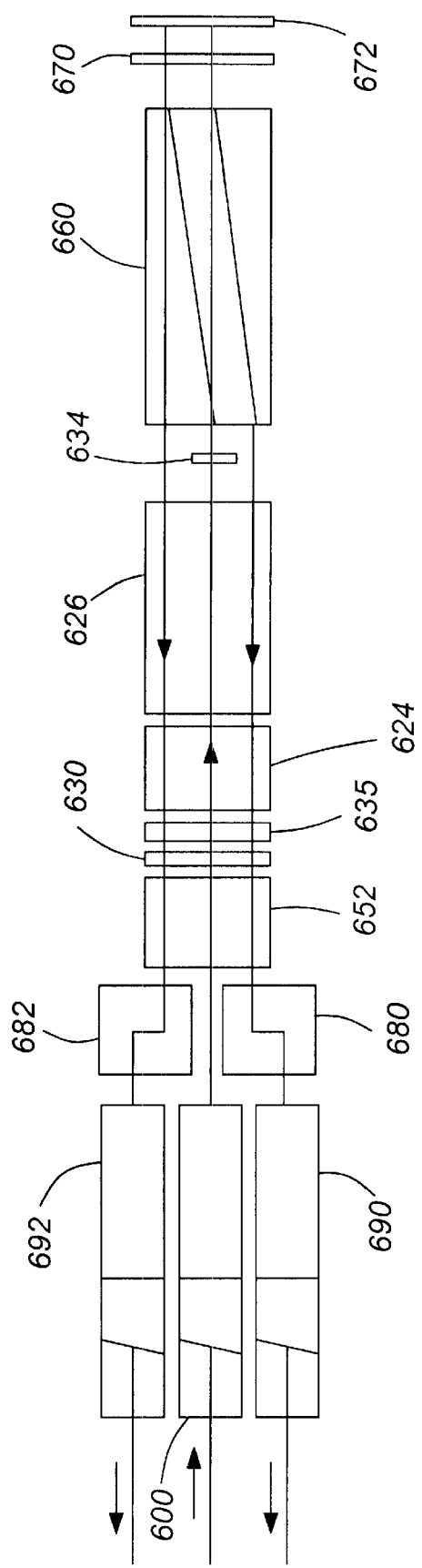
FIG. 7 illustrates a side view of another embodiment of a double-pass folded interleaver/deinterleaver.

FIG. 7 illustrates a side view of an embodiment of the invention similar to the double-pass folded interleaver/deinterleaver of FIG. 6. Walk-in crystal 660 offsets the optical signals, and the quarter wave plate 670 and the mirror 672 reflect the optical signals back through birefringent element 620 as described above. However, in this embodiment, waveplates 636a & 636b are omitted, so that the separated optical signals re-enter the birefringent element 620 with polarizations orthogonal to their polarizations when they exited the birefringent element 620. This arrangement eliminates the dispersion caused by the passage through the birefringent element 620 the first time. The optical signals are reflected back through birefringent element 620 in a similar manner as described above to walk-off crystals 680 an 685, which offset optical signals to ports 690 and 692, respectively.

Figure 8:
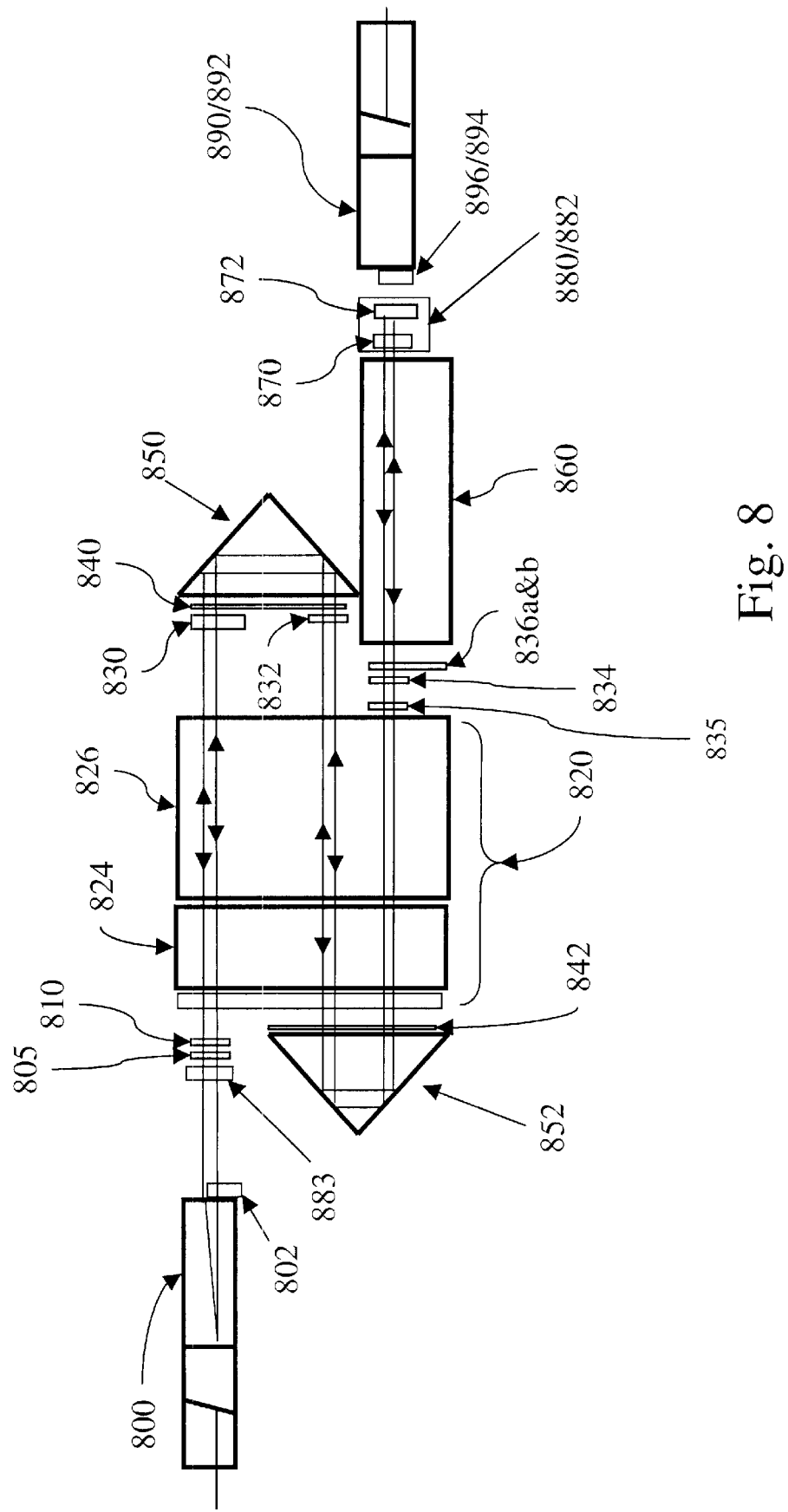
FIG. 8 illustrates a top view of a triple-pass folded deinterleaver/interleaver according to the present invention.

FIG. 8 illustrates a top view of one embodiment of a multi-pass optical interleaver/deinterleaver. In the multi-pass optical interleaver/deinterleaver of FIG. 8, the optical signals make the first pass through the interleaver/deinterleaver to quarter wave mirror 872 in the same manner as with the interleaver/deinterleaver of FIG. 6. Alternate embodiments of multi-pass interleaver/deinterleavers can be found in U.S. patent application Ser. No. 09/476,611, entitled "MULTI-PASS FOLDED INTERLEAVER/DEINTERLEAVERS." The alternate embodiments can also be tuned with a tuning plate.

Tuning plate 835 is used to tune the interleaver/deinterleaver of FIG. 8. In one embodiment, tuning plate 835 is a quartz plate; however, other materials can be used. As described above the thickness and the orientation of the optical axis of tuning plate 835 is chosen to tune the output signals of the interleaver/deinterleaver to the desired frequencies. Tuning plate 835 can be positioned in other locations within the interleaver/deinterleaver.

Quarter wave mirror 872 reflects the signals back through birefringent element 820 in the same manner as the interleaver/deinterleaver of FIG. 6, except that rather than being received and offset by walk off crystals 880 and 882, the optical signals pass through half wave plate 810 and polarizer 805, and are reflected by quarter wave mirrors 883. Quarter wave mirrors 883, and half wave plate 810 rotate the optical signals, whereby the optical signals are reflected back through birefringent element 820 in a similar manner as described above through half wave plate 834 to ports 890 and 892.

Ports 890/892 (port 892 is behind port 890 and therefore obscured in the illustration of FIG. 8) include half wave plates 896/894, respectively. In one embodiment, both half wave plate 896 and half wave plate 894 have azimuth angles of 45° with respect to optical signals received from walk-off crystal 860. Half wave plates 896 and 894 rotate the optical components received such that ports 890 and 892, respectively, each receive a vertically polarized component and a horizontally polarized component, which are combined and directed to optical fibers.

To operate as an interleaver, two sets of optical signals are input to ports 890 and 892. The two sets of optical signals are combined in a manner that is the reverse of the deinterleaver function described above. The combined (interleaved) optical signal is output through port 800. Thus, the apparatus illustrated in FIG. 8 can operate as an interleaver or as a deinterleaver.

Figure 9:
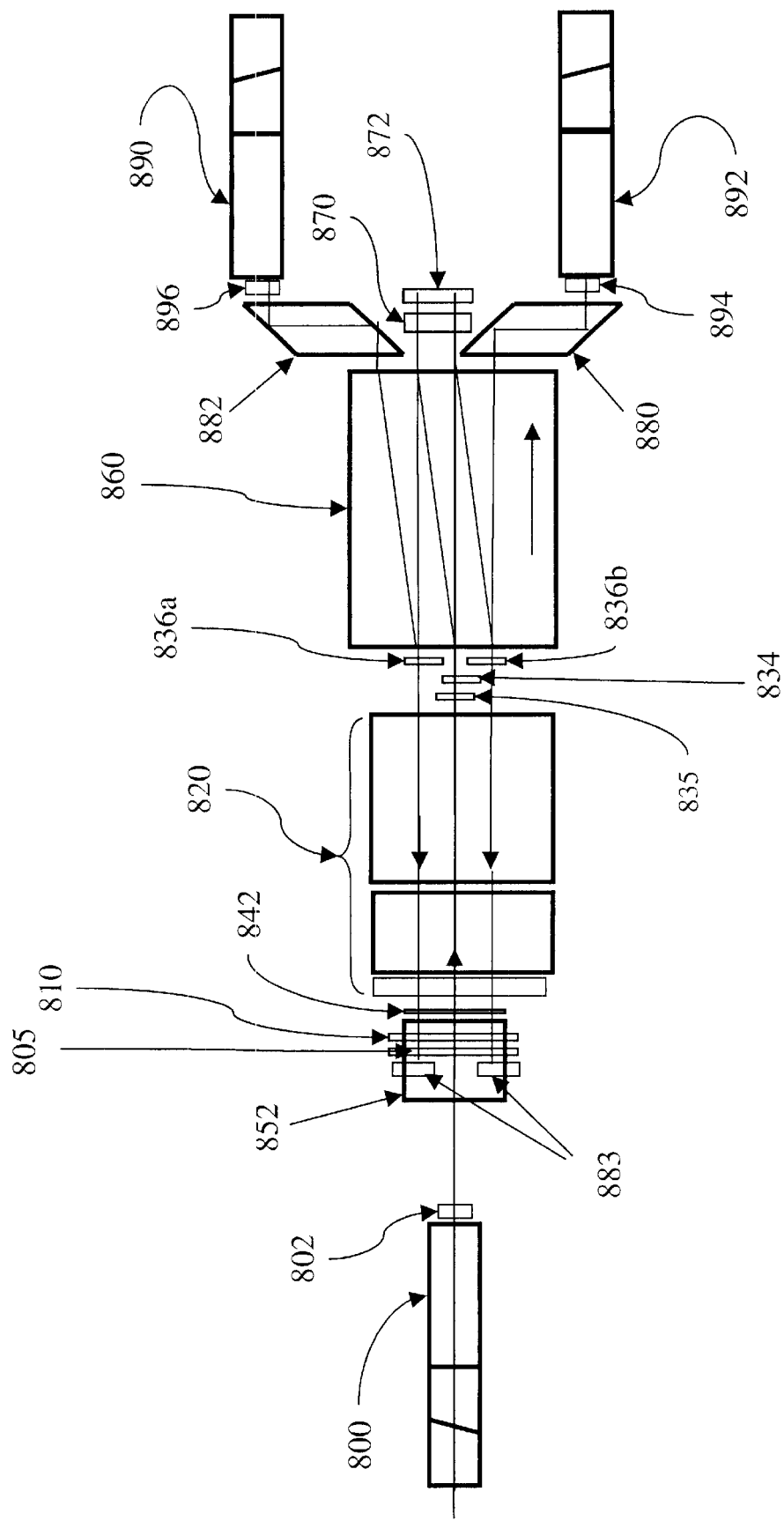
FIG. 9 illustrates a side view of the triple-pass folded deinterleaver/interleaver according to FIG. 8.

FIG. 9 illustrates a side view of the multi-pass optical interleaver/deinterleaver of FIG. 8. As mentioned above, the optical signals make the first pass through the interleaver/deinterleaver to quarter wave mirror 872 in the same manner as with the interleaver/deinterleaver of FIG. 6.

Figure 10:
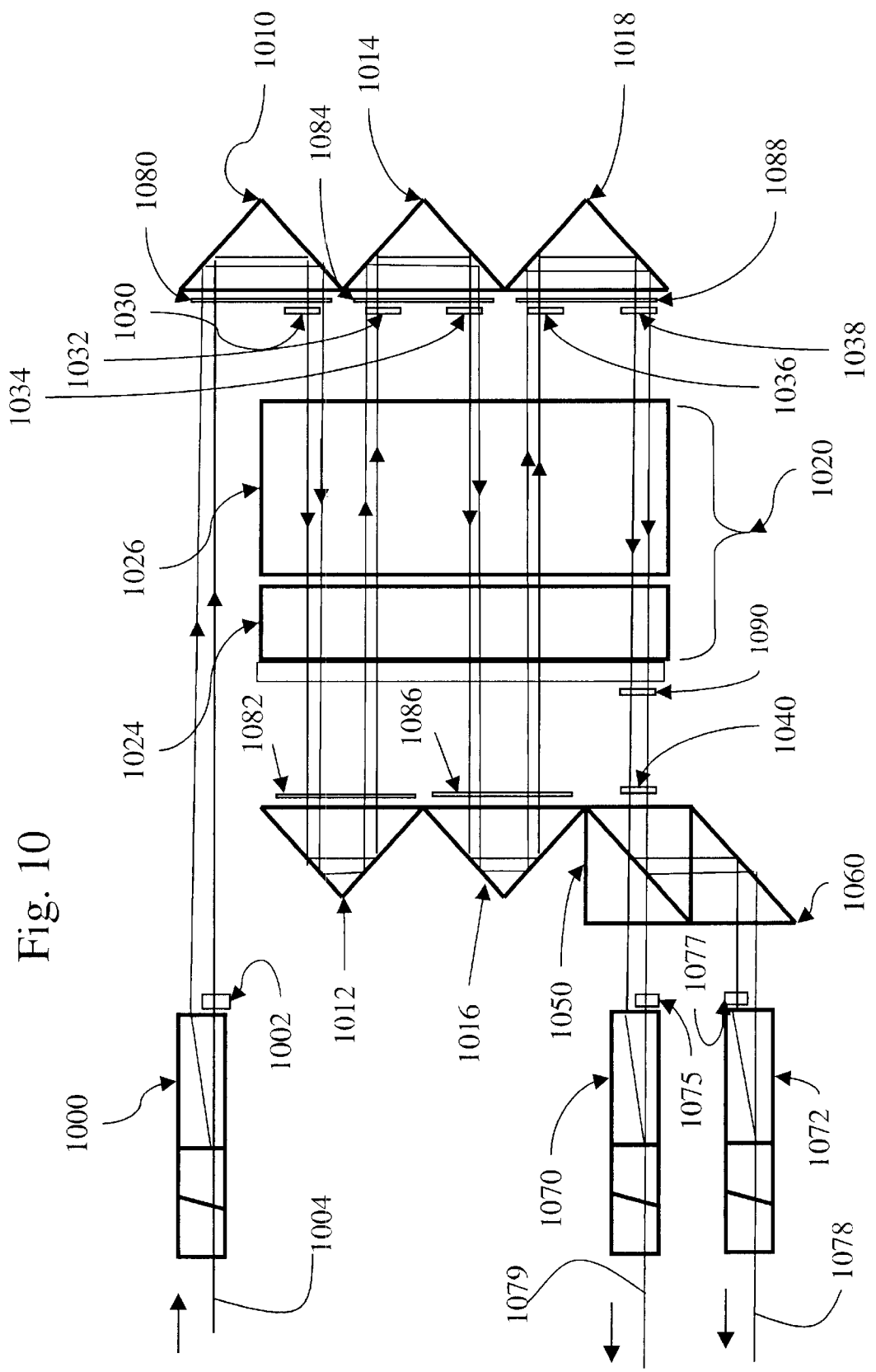
FIG. 10 illustrates a top view single-pass folded deinterleaver/interleaver according to the present invention.

FIG. 10 illustrates one embodiment of a single-pass folded interleaver/de-interleaver having input and output ports on a common side of the device. The arrows of FIG. 10 correspond to the single-pass folded interleaver/deinterleaver operating as a deinterleaver. In other words an optical signal carrying information on multiple frequencies, for example, a wavelength division multiplexed (WDM) signal is received and separated into two optical signals, each of which includes a predetermined subset of frequencies (e.g., even channels and odd channels) from the input optical signal.

An optical signal is received through port 1000. In one embodiment, port 1000 is a collimator assembly having a GRIN lens to collimate the light. Other types of lenses can also be used, or pre-collimated light can be received. Port 1000 receives an optical signal via an optical fiber and collimates the optical signal with the GRIN lens.

In one embodiment, port 1000 also includes half wave plate 1002 to rotate either the vertically polarized component or the horizontally polarized component of the optical signal. In one embodiment, half wave plate 1002 has an azimuth angle of 45° with respect to an optical signal received by port 1000 from optical fiber 1004. In one embodiment, the walk-off crystal of port 1000 offsets the vertically polarized component of the optical signal and half wave plate 1002 causes the vertically polarized component to be horizontally polarized such that both components are horizontally polarized.

The collimated optical signal is directed to reflective element 1010. In one embodiment, reflective element 1010 is a 90° reflecting crystal; however, other reflective elements can be used based on, for example, the physical layout of the interleaver/deinterleaver. In one embodiment, the face(s) through which the optical signal is received and/or reflected has low-order compensator 1080 component to compensate for phase shift in the respective crystals. If the reflective element does not cause a phase shift, low-order compensator 1080 can be omitted.

The optical signal reflected by reflective element 1010 is directed through half wave plate 1030. Half wave plate 1030 introduces a relative phase difference of 180° between the ordinary and extraordinary components of the optical signal. In one embodiment, half wave plate 1030 is oriented with a first predetermined azimuth angle. In one embodiment, the first azimuth angle is in the range of 0° to 10° (e.g., 3.5°) for optical signals passing from reflective element 1010 to birefringent element 1020; however, the azimuth angle can be different with appropriate changes to the angles of one or more other half wave plates.

After passing through half wave plate 1030, the optical signal is directed to birefringent element 1020. In one embodiment, birefringent element 1020 is composed of crystals 1024 and 1026 that are selected to provide improved thermal stability over a range of operating temperatures as compared to a single birefringent crystal. In one embodiment, crystal 1024 is a $TiO_2$ crystal having a thickness of approximately 2 mm, and crystal 1026 is a $YVO_4$ crystal having a thickness of approximately 9.5 mm. In one embodiment, birefringent element 1020 has a cross sectional area that is 5 mm by 8 mm; however, other sizes can also be used. Other birefringent assemblies can also be used, for example, a single crystal can be used if temperature stability is not important, or other two-crystal birefringent assemblies can be used.

After passing through birefringent element 1020, the optical signal is reflected by reflective element 1012 back through birefringent element 1020. In one embodiment, reflective element 1012 is a 90° reflecting crystal; however, other reflective elements can be used. In one embodiment, the face(s) through which the optical signal is received and/or reflected has low-order compensator 1082 to compensate for phase shift in the respective crystals. If the reflective element does not cause a phase shift, low-order compensator 1082 can be omitted.

After passing through birefringent element 1020 as reflected by reflective element 1012, the optical signal passes through half wave plate 1032. In one embodiment, half wave plate 1032 is oriented with the first azimuth angle (e.g., 3.5°) for optical signals passing from birefringent element 1020 to reflective element 1014. Other azimuth angles for half wave plate 1032 or for both half wave plate 1032 and half wave plate 1030 can be used for different filtering characteristics or physical configurations.

After passing through half wave plate 1032, the optical signal is reflected by reflective element 1014. In one embodiment, reflective element 1014 is a 90° reflecting crystal; however, other reflective elements can be used. In one embodiment, the face(s) through which the optical signal is received and/or reflected has low-order compensator 1084 to compensate for phase shift in the respective crystals. If the reflective element does not cause a phase shift, low-order compensator 1084 can be omitted.

The optical signal reflected by reflective element 1014 is directed through half wave plate 1034. In one embodiment, half wave plate 1034 is oriented with a second predetermined azimuth angle. In one embodiment, the second azimuth angle is in the range of 0° to −10° (e.g., −9°) with respect to an optical signal that passes from reflective element 1014 to birefringent element 1020; however, the azimuth angle can be different with appropriate changes to the azimuth angles of one or more other half wave plates.

After passing through birefringent element 1020, the optical signal is reflected by reflective element 1016 back through birefringent element 1020. In one embodiment, reflective element 1016 is a 90° reflecting crystal; however, other reflective elements can be used. In one embodiment, the face(s) through which the optical signal is received and/or reflected has low-order compensator 1086 to compensate for phase shift in the respective crystals. If the reflective element does not cause a phase shift, low-order compensator 1086 can be omitted.

After passing through birefringent element 1020 as reflected by reflective element 1016, the optical signal passes through half wave plate 1036. In one embodiment, half wave plate 1036 is oriented with the second azimuth angle (e.g., −9°) with respect to optical signals that pass from birefringent element 1020 to reflective element 1018. Other azimuth angles for half wave plate 1036 or for half wave plate 1036 and half wave plate 1034 can be used for different filtering characteristics or physical configurations.

After passing through half wave plate 1036, the optical signal is reflected by reflective element 1018. In one embodiment, reflective element 1018 is a 90° reflecting crystal; however, other reflective elements can be used. In one embodiment, the face(s) through which the optical signal is received and/or reflected has low-order compensator 1088 to compensate for phase shift in the respective crystals. If the reflective element does not cause a phase shift, low-order compensator 1088 can be omitted.

The optical signal reflected by reflective element 1018 is directed through half wave plate 1038. In one embodiment, half wave plate 1038 is oriented with a third predetermined azimuth angle. In one embodiment, the third azimuth angle is 22.5° with respect to optical signals that pass from reflective element 1018 to birefringent element 1020. In an alternate embodiment, the azimuth angle of half wave plate 1038 is −22.5° with respect to optical signals that pass from reflective element 1018 to birefringent element 1020.

After passing through birefringent element 1020, the optical signal passes through tuning plate 1090 to half wave plate 1040. In one embodiment, half wave plate 1040 is oriented with the third predetermined azimuth angle (e.g., 22.5°) with respect to optical signals that pass from birefringent element 1020 to beam splitter 1050. In an alternate embodiment, half wave plate 1040 has an azimuth angle of −22.5° with respect to optical signals that pass from birefringent element 1020 to beam splitter 1050.

Tuning plate 1090 is used to tune the interleaver/deinterleaver of FIG. 10. In one embodiment, tuning plate 1090 is a quartz plate; however, other materials can be used. As described above the thickness and the orientation of the optical axis of tuning plate 1090 is chosen to tune the output signals of the interleaver/deinterleaver to the desired frequencies. Tuning plate 1090 can be positioned in other locations within the interleaver/deinterleaver.

In one embodiment, the azimuth angles of half wave plates 1038 and 1040 determine the ports to which the optical signals are directed. If the azimuth angles of half wave plates 1038 and 1040 are 22.5°, a first set of optical signals (e.g., even channels) is directed to port 1070 and a second set of optical signals (e.g., odd channels) is directed to port 1072. If the azimuth angles are −22.5°, the first set of optical signals is directed to port 1070 and the second set of optical signals is directed to port 1072. Thus, half wave plates 1038 and 1040 can be used to provide a switching function. In one embodiment, half wave plates 1038 and 1040 are mechanically movable components. In an alternate embodiment, half wave plates 1038 and 1040 are voltage-controlled liquid crystal components where the voltage can be used to control the switching state of the components.

The optical signal then passes through polarization beam splitter 1050. The polarization beam splitter provides output signals to two output collimators. Polarization beam splitter 1050 splits the optical signal based on polarization. The optical signal is split into a horizontally polarized signal and a vertically polarized signal. One output signal (e.g., the horizontally polarized signal) is directed to port 1070 and the second output signal (e.g., the vertically polarized signal) is directed to reflective element 1060, which reflects the second output signal to port 1072. Other beam splitting components can also be used.

Port 1070 includes half wave plate 1075 and port 1072 includes half wave plate 1077. In one embodiment, both half wave plate 1077 and half wave plate 1075 have azimuth angles of 45° with respect to optical signals received from polarization beam splitters 1050 and 1060. Half wave plates 1077 and 1075 rotate the optical components received such that ports 1072 and 1070, respectively, each receives a vertically polarized component and horizontally polarized component, which are combined and directed to optical fibers 1078 and 1079, respectively.

In one embodiment, one of ports 1070 and 1072 receives even ITU channels and the other port receives odd ITU channels. Other filtering characteristics can also be provided. For example, a first block of channels (e.g., 1–4) can be directed to one port and a second block of channels (e.g., 5–8) can be directed to the other port.

To operate as an interleaver, two sets of optical signals are input to ports 1070 and 1072. The two sets of optical signals are combined in a manner that is the reverse of the deinterleaver function described above. The combined (interleaved) optical signal is output through port 1000. Thus, the apparatus illustrated in FIG. 10 can operate as an interleaver or as a deinterleaver.

Figure 11A:
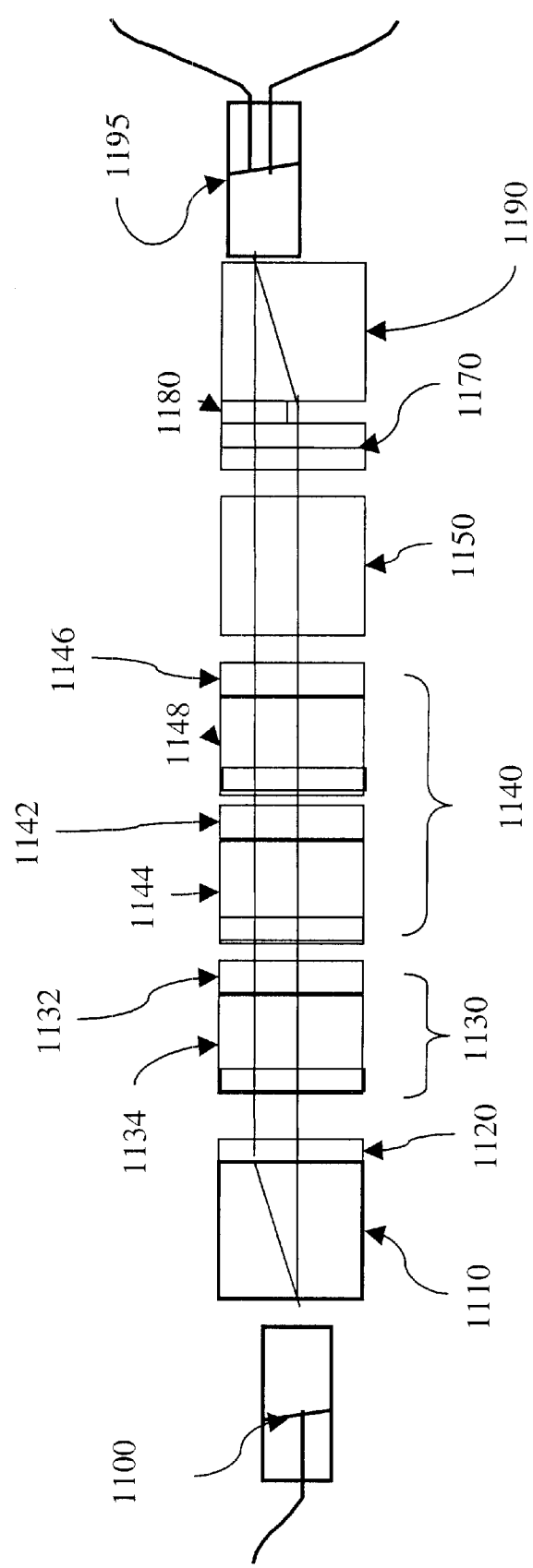
FIGS. 11a and 11b illustrates top and side views, repectively, of a single-pass folded deinterlayer/interleaver according to the present invention.
Figure 11B:
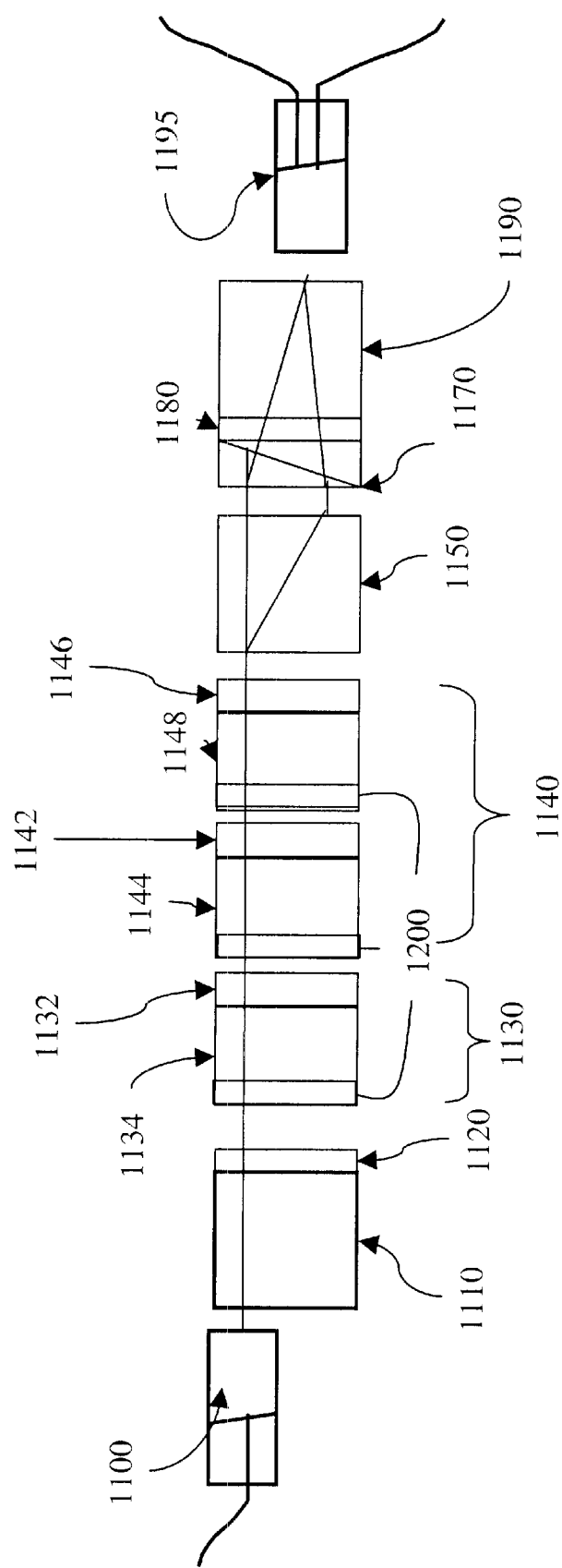

FIG. 11a illustrates a top view of one embodiment of a modularized interleaver/deinterleaver. FIG. 11b illustrates a side view of one embodiment of a modularized interleaver/deinterleaver. For explanation purposes with respect to FIGS. 11a and 11b, the x axis is in the plane of the page of FIGS. 11a and 11b with positive to the top of FIGS. 11a and 11b, the y axis is perpendicular to the page of FIGS. 11a and 11b with positive being into the page, and the z axis is orthogonal to the x and the y axes with positive being to the right of FIGS. 11a and 11b.

When operating as a deinterleaver, an optical signal including even and odd channels is received by port 1100. In one embodiment, port 1100 is a collimator assembly having a GRIN lens to collimate the light and a walk-off crystal to separate the horizontally polarized and the vertically polarized components of the optical signal. Other types of lenses can also be used, or pre-collimated light can be received. Port 1100 receives an optical signal via an optical fiber and collimates the optical signal with the GRIN lens.

Walk off crystal 1110 separates the ordinary and the extraordinary beams of the optical signal. In the embodiment illustrated in FIG. 11, the separation is on a plane that is orthogonal to the page of FIG. 11 (y axis). Other separations can also be used. In one embodiment, polarizer 1120 provides 2.6° of polarization for the optical signal; however, other polarizations can also be used.

The optical signal then passes through birefringent element 1130. In one embodiment, birefringent assembly 1130 is composed of crystals 1132 and 1134 that are selected to provide improved thermal stability over a range of operating temperatures as compared to a single birefringent crystal. In one embodiment, crystal 1132 is a TiO$_2$ crystal having a thickness of 2 mm, and crystal 1134 is a YVO$_4$ crystal having a thickness of 9.5 mm; however, other sizes can also be used. Other birefringent elements can also be used, for example, a single crystal can be used if temperature stability is not important, or other two-crystal birefringent assemblies can be used. In one embodiment, birefringent element 1130 is oriented with an azimuth angle in the range of 0° to −20° (e.g., −13°) for optical signals passing from left to right in FIG. 11. Other azimuth angles can also be used.

In one embodiment, birefringent element 1140 includes four crystals, two of which are TiO$_2$ (1142 and 1146) and two of which are YVO$_4$ (1144 and 1148). In one embodiment, the TiO$_2$ crystals have a thickness of 2 mm and the YVO$_4$ crystals have a thickness of 9.5 mm; however, other thicknesses can be used. Other birefringent elements can also be used. In one embodiment, birefringent element 1130 and 1140 are oriented with an azimuth angle in the range of −11° to −15° (e.g., −13.5°) and 40° to 50° (e.g., 45°) for optical signals passing from left to right in FIG. 11. Other azimuth angles can also be used.

Walk-off crystal 1150 separates the optical signals within the plane of the page of FIG. 11 (x axis). Wollaston beam splitter 1170 splits the optical signal in the x direction.

Half wave plate 1180 is oriented with an azimuth at 45°; however, other azimuth angles can be used. Walk-off crystal 1190 offsets the optical signals in the x direction to bring the optical signals closer together. The optical signals are directed to port 1195. In one embodiment, port 1195 is a dual-fiber collimator that directs two optical signals to two fibers. In alternate embodiments, Wollaston beam splitter 1170 can be replaced with a polarization beam splitter and two single-fiber collimators for port 1195.

When operating as an interleaver, the reverse process takes place. Two optical signals (e.g., even channels and odd channels) are received by port 1195. As the optical signals pass through the interleaver/deinterleaver, the optical signals are combined into a single optical signal having even and odd channels. The combined signal is output through port 1100.

Tuning plates 1200 is used to tune the interleaver/deinterleaver of FIG. 11. In one embodiment, tuning plates 1200 is a quartz plate; however, other materials can be used. As described above the thickness and the orientation of the optical axis of tuning plates 1200 is chosen to tune the output signals of the interleaver/deinterleaver to the desired frequencies. Tuning plates 1200 can be positioned in other locations within the interleaver/deinterleaver.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method of tuning an optical component, of the type including a birefringent subcomponent, comprising the steps of:

determining a frequency response of the optical component; and modifying the frequency response of the optical component with a tuning plate having a thickness and an optical axis orientation;

wherein the tuning plate has a small birefringence as compared to the birefringent subcomponent.

2. The method of claim 1 wherein the tuning plate comprises a quartz plate.

3. The method of claim 1 wherein modifying the frequency response of the optical component comprises inserting the tuning plate into the optical path of the optical component.

4. The method of claim 1 further comprising modifying the angle of the component.

5. An apparatus for tuning an optical component, of the type including a birefringent subcomponent, comprising:

means for determining a frequency response of the optical component; and means for modifying the frequency response of the optical component with a tuning plate having a thickness and an optical axis orientation;

wherein the tuning plate has a small birebringence as compared to the birefringent subcomponent.

6. The apparatus of claim 5 wherein the tuning plate comprises a quartz plate.

7. The apparatus of claim 5 wherein modifying the frequency response of the optical component comprises inserting the tuning plate into the optical path of the optical component.

8. The apparatus of claim 5 further comprising modifying the angle of the component.

9. The method according to claim 1, wherein the optical component is a birefringent crystal interleaver, and the birefringent subcomponent is a birefringent crystal element.

10. The apparatus according to claim 5, wherein the optical component is a birefringent crystal interleaver, and the birefringent subcomponent is a birefringent crystal element.

11. An optical component having an optical path comprising:

a birefringent subcomponent providing a frequency response for an input optical signal traveling along the optical path; and a tuning plate positioned in the optical path for modifying the frequency response of the birefringent subcomponent;

wherein the tuning plate has a small birefringence as compared to the birefringent subcomponent.

12. The optical component according to claim 11, wherein the tuning plate comprises a quartz plate.

13. The optical component according to claim 11, wherein the optical component is a birefringent crystal interleaver, and the optical subcomponent is a birefringent crystal element.

* * * * *